(12) United States Patent
Bewersdorf et al.

(10) Patent No.: US 8,704,150 B2
(45) Date of Patent: Apr. 22, 2014

(54) BEAM SPLITTER MODULE HAVING A SECONDARY BEAM SPLITTER FOR PROVIDING ORTHOGONAL LIGHT BEAMS AND PARALLEL LIGHT BEAMS

(75) Inventors: Joerg Bewersdorf, Branford, CT (US); Brian Thomas Bennett, Park City, UT (US)

(73) Assignees: University of Utah Research Foundation, Salt Lake City, UT (US); Yale University, New Haven, CT (US)

( * ) Notice: Subject to any disclaimer, the term of this patent is extended or adjusted under 35 U.S.C. 154(b) by 240 days.

(21) Appl. No.: 13/363,030

(22) Filed: Jan. 31, 2012

(65) Prior Publication Data

US 2012/0193520 A1 Aug. 2, 2012

Related U.S. Application Data

(63) Continuation-in-part of application No. PCT/US2009/058993, filed on Sep. 30, 2009.

(60) Provisional application No. 61/273,212, filed on Jul. 31, 2009.

(51) Int. Cl.
*H01J 3/14* (2006.01)

(52) U.S. Cl.
USPC ..................................... 250/216; 250/201.2

(58) Field of Classification Search
USPC ............... 250/216, 201.2, 201.3, 227.11; 359/197.1, 388, 383, 368, 385, 618; 369/44.23
See application file for complete search history.

(56) References Cited

U.S. PATENT DOCUMENTS

| | | | |
|---|---|---|---|
| 3,586,764 A | 6/1971 | Diehl et al. | |
| 4,566,760 A | 1/1986 | Abramovitz et al. | |
| 4,575,191 A | 3/1986 | Abramovitz | |
| 5,278,680 A | 1/1994 | Karasawa et al. | |
| 6,396,069 B1 * | 5/2002 | MacPherson et al. | ... 250/559.22 |
| 7,538,939 B2 | 5/2009 | Zimmerman et al. | |
| 2006/0171021 A1 | 8/2006 | Scott et al. | |
| 2007/0051869 A1 | 3/2007 | Knebel | |

FOREIGN PATENT DOCUMENTS

| | | |
|---|---|---|
| JP | 04-058215 | 2/1992 |
| JP | 10-048762 | 2/1998 |

OTHER PUBLICATIONS

Cassaing et al; Darwin Fringe Sensor (DWARF): Concept Study; Proc. Towards Other Earths: Darwin/TPF and the Search for Extrasolar Terrestrial Planets; ESA SP-539; Apr. 2003; pp. 389-392.

* cited by examiner

*Primary Examiner* — Que T Le

(74) *Attorney, Agent, or Firm* — Thorpe North & Western LLP

(57) ABSTRACT

A primary beam splitter (310) of an optical apparatus (300) can be used to split an incident light beam (305) into a primary plurality of light beams and to direct a first beam therefrom in a first direction and a second beam therefrom in a second direction orthogonal to the first direction. Secondary beam splitters (315*a,b*) positioned in beam paths of the first and second beams can be used to split the first and second beams of the primary plurality of light beams into a secondary plurality of light beams (320*a,b*) and to split the same into a tertiary plurality of light beams (325*a,b*). A primary plurality of beam reflectors (335*a,b*/340*a,b*/345*a,b*) can be positioned and used to redirect the secondary and tertiary plurality of light beams toward a common detector (355).

20 Claims, 12 Drawing Sheets

BEAM SPLITTER MODULE HAVING A SECONDARY BEAM SPLITTER FOR PROVIDING ORTHOGONAL LIGHT BEAMS AND PARALLEL LIGHT BEAMS

RELATED APPLICATIONS

This application is a continuation-in-part of International Application No. PCT/US09/58993, filed Sep. 30, 2009 which claims the benefit of U.S. Provisional Application No. 61/273,212, filed Jul. 7, 2009 which are both incorporated herein by reference.

BACKGROUND

Optical systems have long been used for focusing, directing, and manipulating beams of light. Optical systems are used in many different areas of technology for a wide variety of purposes. Engineering and research areas are just a couple of examples of the wide field of use of current optical technologies. Often, engineers, researchers, or others, wish to split a beam of light into multiple beams of light. Beam splitter optical devices have been developed to accomplish this task. Beam splitter devices can split a beam of light into multiple beams of light in various ways. For example, a dichroic beam splitter can split a beam of light into multiple beams of light based on a wavelength of the light incident on the beam splitter. A polarizing beam splitter can split a beam of light into multiple beams of light based on polarization orientations of the beam of light. A neutral beam splitter can split a beam of light into multiple beams of light which are approximately equal in intensity and neutral in color (e.g., wavelength) or polarization. Other types of beam splitting devices also exist, such as matrix beam splitters, pellicle beam splitters, wire grid polarizing beam splitters, and so forth. Furthermore, such beam splitters can be fashioned in a variety of shapes, sizes, or forms, including plates, cubes, etc.

However, despite the capabilities and features of various existing beam splitter optical devices, such devices are often expensive, difficult to manufacture, difficult to assemble with a certain precision, and can be space-consuming either in terms of the size of the elements used or in terms of spacing between the different elements of the system or device. Some fields of research use microscopes and other optical systems to study cells, molecules, and other biological or chemical samples. In such fields of research, sophisticated microscope systems can occupy a significant portion of a small laboratory. Conventional beam splitting devices can be a contributing factor in floor space used by sophisticated microscopes involving beam splitting. Due to their size they are also vulnerable to vibrations, thermal drift and pollution.

Engineers, scientists, and others would be able to benefit greatly from a beam splitter apparatus which was able to overcome at least some of the deficiencies of prior systems and in particular be smaller or more compact than prior systems to preserve floor space while reducing some of the complexity in some prior systems.

SUMMARY

A primary beam splitter of an optical apparatus can be used to split an incident light beam into a primary plurality of light beams and to direct a first beam of the primary plurality of light beams in a first direction and a second beam of the primary plurality of light beams in a second direction orthogonal to the first direction. A plurality of secondary beam splitters positioned in beam paths of the first and second beams can be used to split the first and second beams of the primary plurality of light beams into a secondary plurality of light beams and to split the second beam of the primary plurality of light beams into a tertiary plurality of light beams. A primary plurality of beam reflectors can be positioned and used to redirect the secondary and tertiary plurality of light beams toward a common detector.

DETAILED DESCRIPTION

Figure 1:
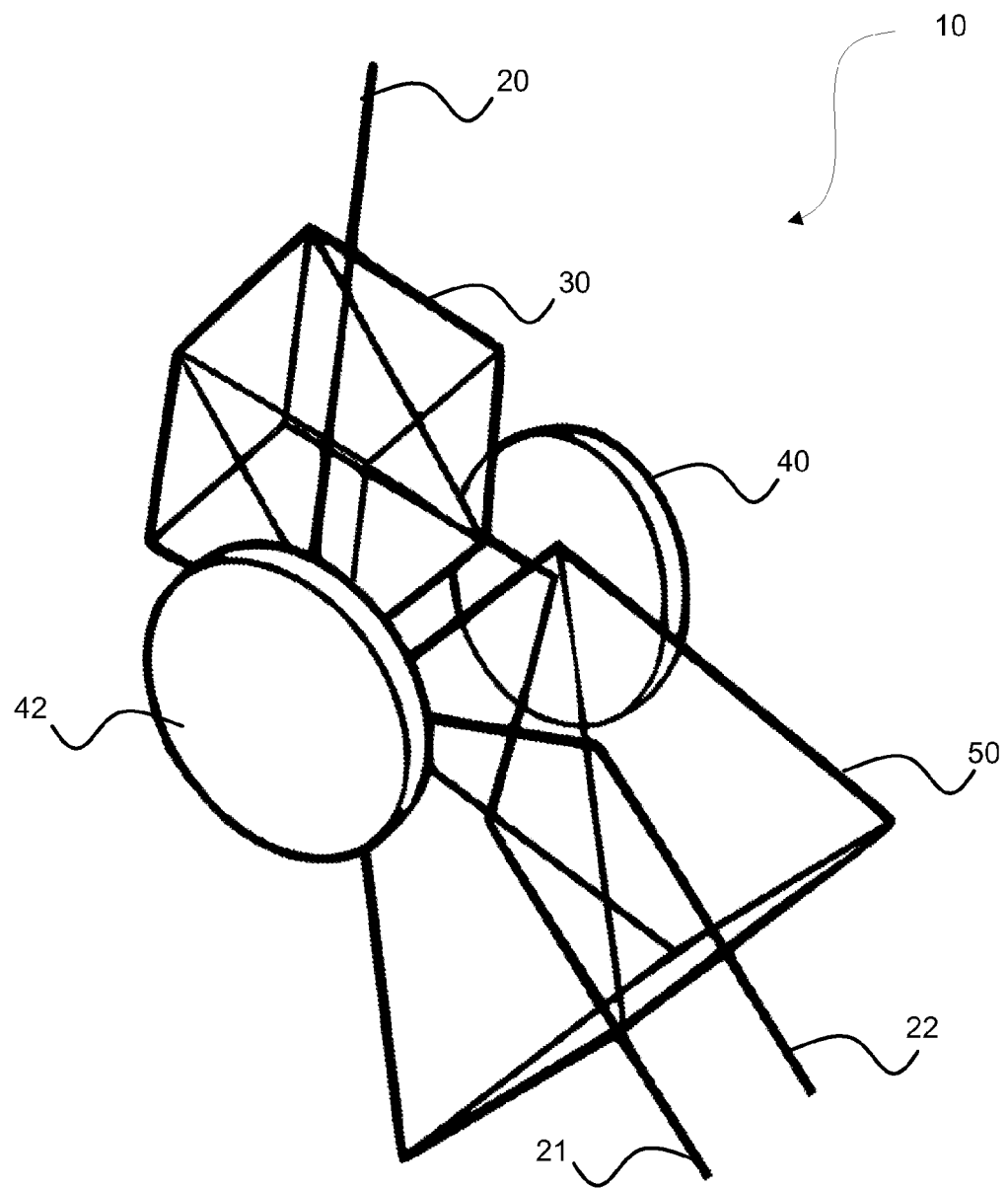
FIG. 1 is a perspective view of a beam splitter apparatus in accordance with an embodiment.

Reference will now be made to the exemplary embodiments illustrated, and specific language will be used herein to describe the same. It will nevertheless be understood that no limitation of the scope of the invention is thereby intended. Additional features and advantages will be apparent from the detailed description which follows, taken in conjunction with the accompanying drawings, which together illustrate, by way of example, features of the invention.

In describing and claiming the present invention, the following terminology will be used in accordance with the definitions set forth below.

As used herein, "optically coupled" refers to a relationship between structures that allows beams of light to flow at least partially between them. This definition is intended to include aspects where the structures are in physical contact and those aspects where the structures are not in physical contact.

As used herein, "adjacent" refers to near or close sufficient to achieve a desired affect. Although direct physical contact is most common and preferred in the structures or volumes of the present invention, adjacent can broadly allow for spaced apart features.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect on the property of interest thereof.

As used herein, the term "about" is used to provide flexibility to a numerical range endpoint by providing that a given value may be "a little above" or "a little below" the endpoint with a degree of flexibility as would be generally recognized by those skilled in the art. Further, the term about explicitly includes the exact endpoint, unless specifically stated otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation can apply regardless of the breadth of the range or the characteristics being described.

Described herein are systems and methods for splitting a beam of light involving a beam splitter, a plurality of mirrors, and a prism. The beam splitter can be used for splitting an incoming light beam into two outgoing light beams. Mirrors reflect each outgoing light beam towards the prism. Each beam enters the prism through a different face and is reflected from an opposing internal prism face. In one aspect, the entire beam can be reflected from the opposing internal prism face through total internal reflection. The light beams can exit the prism such that each beam of light is substantially parallel.

In a more detailed embodiment, the beam splitter module further includes a second beam splitter, at least one additional mirror (or optionally a second plurality of mirrors), and optionally a second prism. The two light beams from the first prism can pass through the second beam splitter, resulting in four light beams. The additional mirror can reflect two of the light beams in a similar direction as a direction of the other two light beams after passing through or reflecting off of the second beam splitter. Where a plurality of mirrors is used, the four light beams can be directed into the second prism, be internally reflected from the faces of the prism and exit the prism substantially parallel.

Additional embodiments of the beam splitter module can include a camera chip configured to detect the light beams exiting the first or the second prism. The mirrors receiving the light from the beam splitter can be positioned such that light beam paths have a same length when the beam splitter is a dichroic beam splitter and can be positioned such that light beam paths have a different length when the beam splitter is a neutral beam splitter. Additional types of beam splitters may also be used.

The beam splitting systems and methods described herein may be utilized in many different fields of uses. Although description of the systems and methods herein may be described in some instances in connection with microscopes, no limitation of the systems and methods to microscopy systems is intended and other fields of use are also contemplated, for example in DNA sequencers, plate readers, spectrophotometers or other light collection devices.

As illustrated in FIG. 1, an optical apparatus is shown, indicated generally at 10, in an example implementation in accordance with an embodiment. The apparatus includes a beam splitter 30. The beam splitter can be configured to split an incident light beam 20 into a primary plurality of light beams 21, 22. Though a single light beam is shown here, any number of light beams may be incident on the beam splitter and each can be split into two or more light beams.

The beam splitter may be any type of beam splitting device. For example, a dichroic beam splitter can split a beam of light into multiple beams of light based on a wavelength of the light incident on the beam splitter. A polarizing beam splitter can split a beam of light into multiple beams of light based on polarization orientations of the beam of light. A neutral beam splitter can split a beam of light into multiple beams of light which are approximately equal in intensity and neutral in color (e.g., wavelength) or polarization. Other beam splitting devices, such as matrix beam splitters, pellicle beam splitters, wire grid polarizing beam splitters, silvered mirror beam splitters, and so forth, may also be used. Furthermore, such beam splitters can be fashioned in a variety of shapes, sizes, or forms, including plates, cubes, etc.

The beam splitter 30 shown in FIG. 1 is a neutral beam splitter cube. The beam splitter cube shown is made from two triangular glass prisms which are glued together with a partially reflective coating in between the two prisms. The light beam 20 enters the cube through a first face and strikes an internal face where the two prisms are glued together at approximately a 45° angle with respect to the light beam. Approximately half of the beam is reflected at a 90° angle with respect to the incident light beam and approximately half of the beam is transmitted through the internal face and out of the beam splitter cube.

A primary plurality of beam reflectors 40, 42 can be positioned in corresponding optical beam paths of the primary plurality of light beams 21, 22 as they exit the beam splitter 30. In one aspect the beam reflectors can be mirrors. In additional embodiments, the beam reflectors can be any other form of device which reflects at least a portion of light beams incident on the beam reflector. For example and not by way of limitation, a beam reflector may be a beam splitter which splits the incident light beam by reflecting a portion of the beam and transmitting a portion of the beam. The transmitted portion of the beam may be captured and/or reflected for subsequent use in the same or a different beam splitting system or other system. The primary plurality of beam reflectors shown in FIG. 1 comprises mirrors. Though the mirrors are shown circularly shaped, virtually any shape of mirror may be used. The primary plurality of beam reflectors can be configured to redirect the primary plurality of light beams toward a common or same first prism 50.

The first prism 50 can be any suitable type of prism and may be made from any suitable material. In one aspect, the first prism is made from glass. In one aspect, the first prism can be a 60° prism. In one aspect, the first prism can be a Kösters (i.e. Koesters) double prism. The first prism can be positioned in the optical beam paths of the primary plurality of light beams such that a first light beam 21 of the primary plurality of light beams enters the common first prism through a first incoming first prism face and a second light beam 22 of the primary plurality of light beams enters a second incoming first prism face. The first prism can be configured to reflect the first and second light beams in a substantially parallel direction out of the first prism through an outgoing first prism face. For example, the first and second light beams can be reflected through total internal reflection within the prism such that the beams of light exit the prism through the outgoing first prism face substantially perpendicular to the outgoing first prism face and substantially parallel to one another.

In some embodiments, the system 10 may provide first 21 and second 22 light beams which are distinguishable one from another. For example, the beam splitter 30 may be a dichroic beam splitter configured to split into incident light beam comprising a plurality of wavelengths into multiple light beams based on wavelength. For example, the dichroic beam splitter may split an incident light beam comprising red and green light into a red light beam and a green light beam. In an embodiment where the beam splitter is a neutral beam splitter, such as a beam splitter cube, the first and second light beams can be distinguished by creating different path lengths for the light beams. One of the beam reflectors 40 and 42 can be positioned differently than the other, such as being placed slightly farther away from or closer to the beam splitter, to create a longer path length for one of the light beams. In microscope systems where the light beam is used to create an image, a longer path length can provide an image from a different focal plane in a sample in the microscope. However, embodiments with a neutral beam splitter do not need to have the beam reflectors at different positions to create different path lengths. For example, a neutral beam splitter may be used with one or more beam reflectors to create two optical beams substantially identical in path length, wavelength, etc.

By way of an example application of the optical beam splitter module described above implemented in a microscopy system, and not by way of limitation, the module can be used in microscopy systems and methods for creating three dimensional images using probe molecules. Three dimensional images can be created using probe molecules. A sample having a plurality of probe molecules can be mounted on a stage. The sample can be illuminated with light to cause probe luminescence. The probe luminescence can be split into at least two paths corresponding to at least two detection planes corresponding to object planes in the sample. The at least two planes are detected via a camera. Alternatively, the probe luminescence can be split into at least four detection planes corresponding to at least four object planes in the sample and by using an additional beam splitter. For example, a four-channel configuration can offer three or more colors for imaging, or two colors and polarization which can optionally use a single focal plane. Object planes in corresponding recorded regions of interest can be recorded by a camera. A signal from the regions of interest can be combined and analyzed to produce a three dimensional image.

In accordance with one aspect, detecting at least four detection planes via the camera includes detecting at least two first detection planes via a first camera and detecting at least two second detection planes via a second camera. In accordance with one aspect detecting at least four detection planes via the camera includes detecting each detection plane in a different region of a CCD chip of a single camera. In one embodiment, the method further comprises dichroically separating the probe luminescence into at least two wavelengths (or ranges of wavelengths) of light prior to or after splitting the probe luminescence. A first at least two of the at least four paths into which the probe luminescence is split can correspond to a first wavelength of the at least two wavelengths, and a second of at least two paths of the at least four paths into which the probe luminescence is split can correspond to a second wavelength of the at least two wavelengths. Dichroic separation of probe luminescence can allow for simultaneous imaging of probe molecules of different colors.

Figure 2:
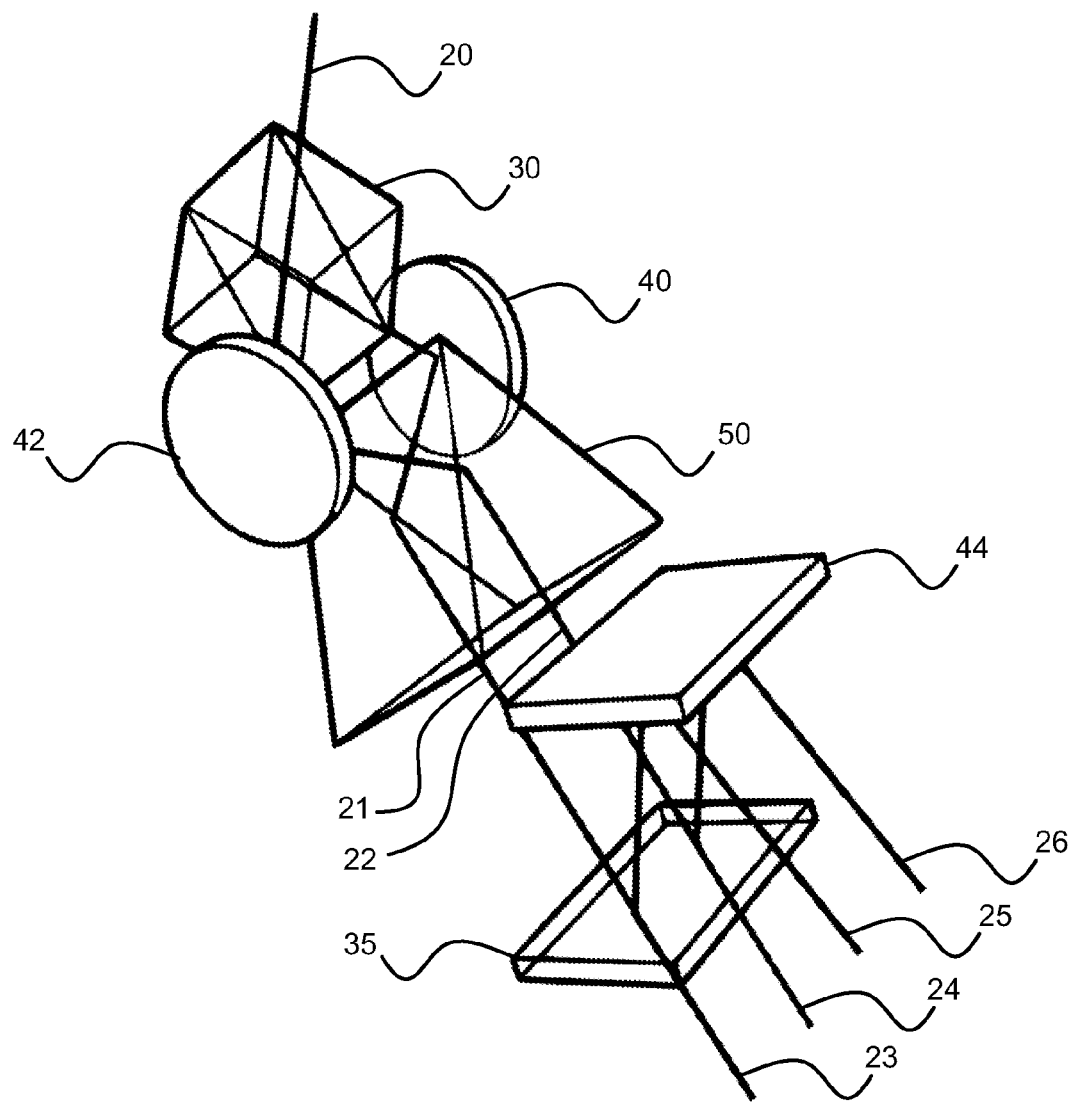
FIG. 2 is a perspective view of a beam splitter apparatus including multiple beam splitters in accordance with an embodiment.

Referring now to FIG. 2, a beam splitting module in accordance with a more detailed embodiment is provided which is configured to split an incident light beam 20 into four light beams 23, 24, 25, 26. The beam splitting module operates in a similar manner as has been described above regarding FIG. 1. Namely, an incident light beam is split into two light beams 21, 22 which are redirected by beam reflectors 40, 42 toward a prism 50 from which the light beams exit substantially parallel to one another. A secondary beam splitter 35 can be positioned in an optical beam path of the first and second light beams 21, 22 after the first and second light beams have passed through the outgoing first prism face.

The secondary beam splitter 35 can be configured to split the first light beam into a secondary plurality of light beams 23, 25 and configured to split the second light beam into a tertiary plurality of light beams 24, 26. The secondary beam splitter is illustrated as a neutral beam splitter, although other splitter types can also be used. In one aspect, the beam splitter can alternately be described as functioning to split the first and second light beams into secondary and tertiary pluralities of light beams wherein at least one of the resultant or split light beams from each of the first and second light beams forms the secondary plurality of light beams and a different at least one of the resultant or split light beams from each of the first and second light beams forms the tertiary plurality of light beams. In other words, the secondary plurality of light beams comprises beams 25 and 26 and the tertiary plurality of light beams comprises beams 23 and 24 in the embodiment illustrated by FIG. 2. A secondary beam reflector 44 can be positioned in the optical beam path of the secondary plurality of light beams (or alternatively in the optical beam path of the tertiary plurality of light beams). The secondary beam reflector can be configured to redirect the secondary plurality of light beams 25, 26 in a direction substantially parallel with a direction of the tertiary plurality of light beams 23, 24.

The secondary beam splitter can be different from the first beam splitter or may be the same. Using a single secondary mirror can result in an optical path length differentiation between the beams transmitted by the secondary beam splitter and the beams reflected by the secondary beam splitter. For example, the primary and secondary beam splitters may both be neutral beam splitters and the primary plurality of beam reflectors may be positioned to create multiple optical path lengths. As such, using the system of FIG. 2 would result in four different optical path lengths. Using the microscopy 3D imaging example described above, the four different optical path lengths could be used to simultaneously image four different object planes of a sample. In a different embodiment and continuing with the microscope example, the primary beam splitter 30, though shown as a neutral beam splitter cube, may instead be a dichroic beam splitter and the primary plurality of beam reflectors may be positioned to create a same optical path length for each of the first and second light beams 21, 22. The use of the secondary beam reflector 44 can allow for simultaneous imaging of different colored probe molecules at multiple object planes.

Though in the example embodiment shown in FIG. 2 and other examples shown and described in the figures and description herein the primary and secondary beam splitters are shown as being of a certain type, form, or shape, no such limitation is intended, and the beam splitters may comprise any type, form, shape, etc. of beam splitter in any configuration or combination.

Figure 3:
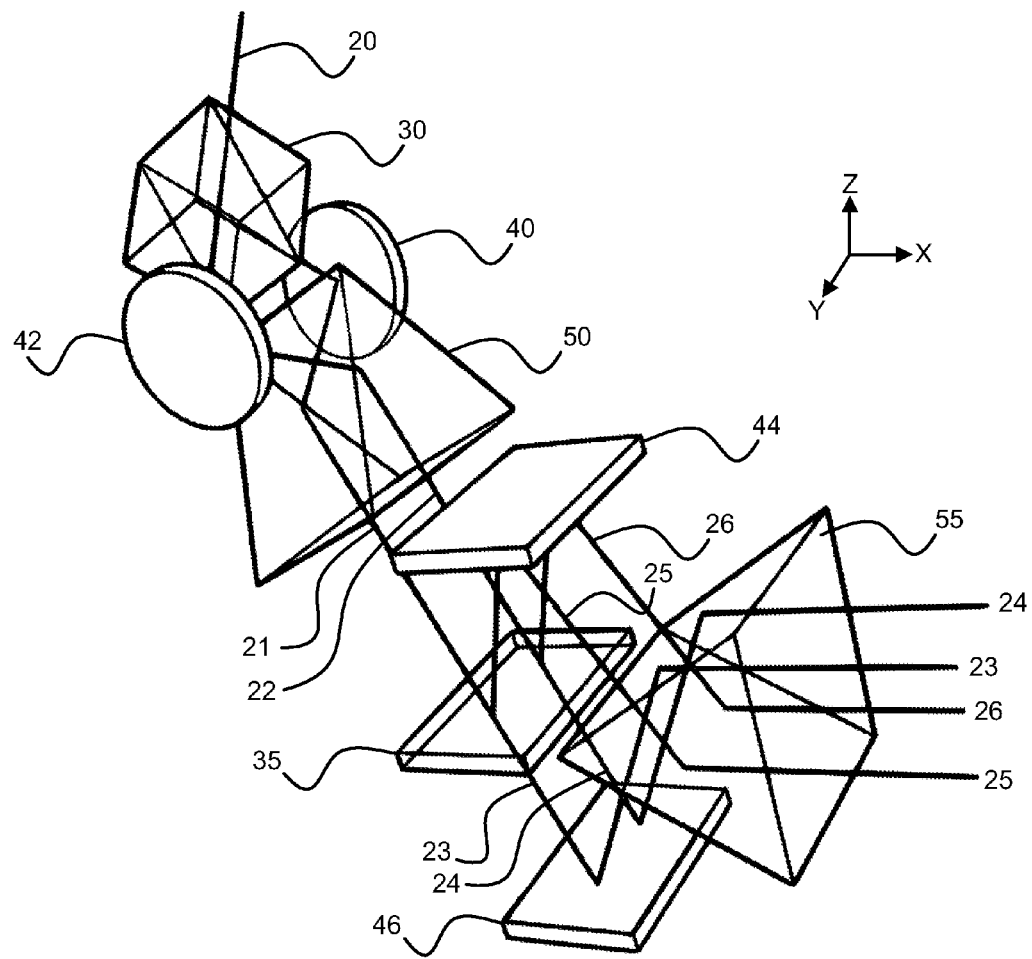
FIG. 3 is a perspective view of a beam splitter apparatus including multiple prisms in accordance with an embodiment.

Referring now to FIG. 3, a beam splitting module in accordance with a more detailed embodiment of FIG. 1 is provided which is configured to split an incident light beam 20 into four light beams 23, 24, 25, 26 and using a second prism 55. The apparatus of FIG. 1 may further comprise a secondary beam splitter 35 positioned in an optical beam path of the first and second light beams 21, 22 after the first and second light beams have passed through the outgoing first prism 50 face. The secondary beam splitter can be configured to split the first light beam and the second light beam into a secondary plurality of light beams 25, 26 and a tertiary plurality of light beams 23, 24. A secondary plurality of beam reflectors 44, 46 can be positioned in optical beam paths of the secondary plurality of light beams and the tertiary plurality of light beams. The secondary plurality of beam reflectors can be configured to redirect the secondary plurality of light beams and the tertiary plurality of light beams toward a common or same second prism 55.

The second prism 55 can be positioned in the optical beam paths of the secondary plurality of light beams 25, 26 and the tertiary plurality of light beams 23, 24. The second prism can be positioned such that the secondary plurality of light beams enters the second prism through a first incoming second prism face and the tertiary plurality of light beams enters the second prism through a second incoming second prism face. The second prism can be configured to reflect the secondary plurality of light beams and the tertiary plurality of light beams in a substantially parallel direction out of the second prism through an outgoing second prism face.

The second prism 55 can be the same type of prism or a different type of prism as the first prism 50. In an example embodiment, both of the first and second prisms are 60° prisms or Koesters double prisms. In one aspect the first and the second prisms can be rotated 90° degrees from one another in one dimension to provide proper alignment of the prism with the light beams for redirecting the light beams through the outgoing face in a substantially parallel direction. There may be additional rotation in other dimensions to further provide a proper alignment. For example, the second prism may be rotated approximately 90° along an x-axis and approximately 45° along a y-axis.

The secondary plurality of beam reflectors 44, 46 may be positioned such that an optical path length of light beams incident on the secondary plurality of beam reflectors from the secondary beam splitter 35 to the second prism 55 are substantially the same. In another embodiment, the secondary plurality of beam reflectors can be positioned to create multiple path lengths as has been described. In one embodiment, the incident light beam 20 may comprise four colors of light, both the primary and secondary beam splitters 30, 35 may be dichroic beam splitters, and the primary and secondary plurality of beam reflectors can be uniformly positioned such that each of the resultant light beams 23, 24, 25, 26 comprise an equal path length light beam of a different color.

The basic structure of FIG. 1, 2, or 3 may be repeated any number of times to split one or more light beams into any number of desired light beams. For example, the system of FIG. 3 can be repeated such that the resultant light beams 23, 24, 25, 26 are each further split into four light beams resulting in 16 total light beams. Various combinations of beam splitter devices, beam reflector positioning, etc. can be used to have 16 output beams each having a different characteristic or combination of characteristics (e.g., optical path length, wavelength, etc.). As has been described above, any of the beam reflectors may comprise beam splitter devices which can allow for branching into other structures similar to or different from those described herein and the transmitted light beams can be used for various purposes.

Figure 4:
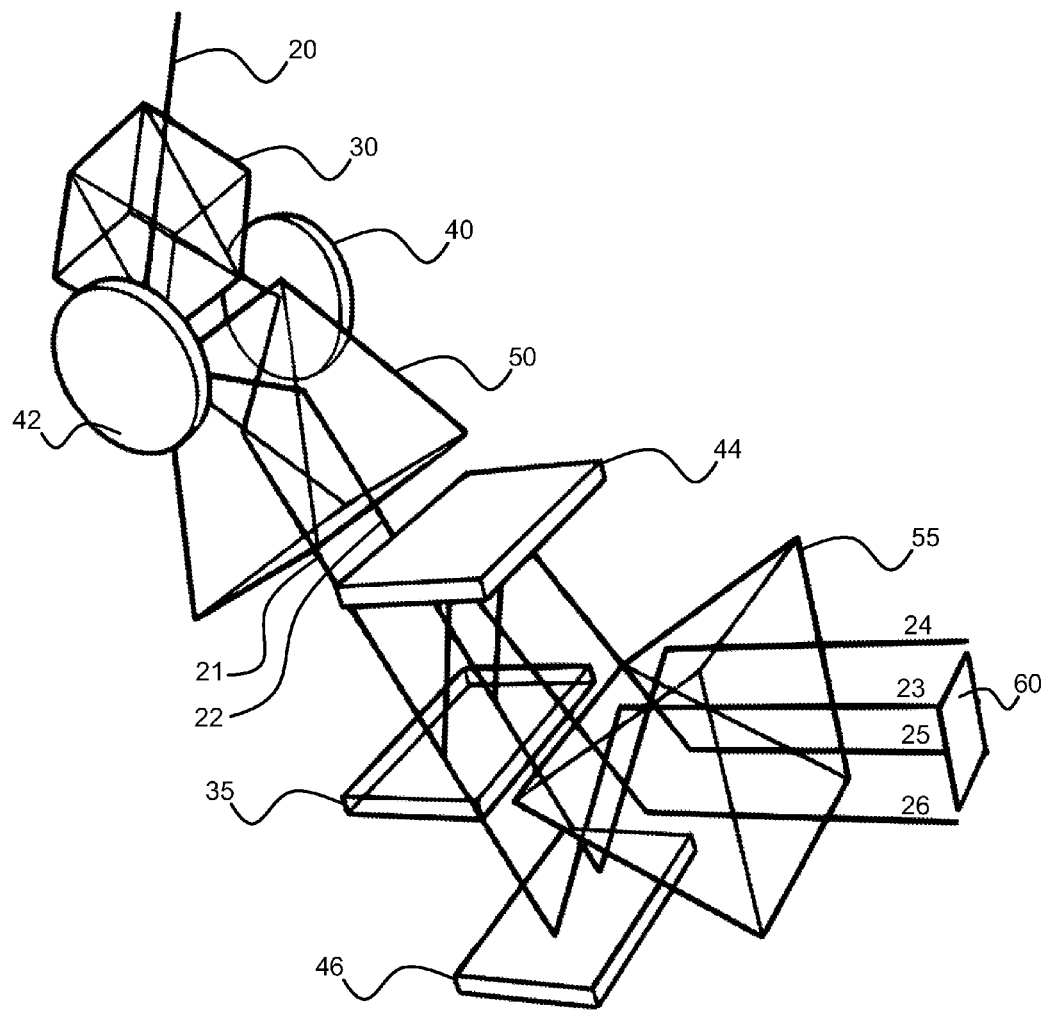
FIG. 4 is a perspective view of a beam splitter apparatus including a camera or image capture device in accordance with an embodiment.

FIG. 4 shows a structure similar in many regards to that described above regarding FIG. 3. FIG. 4 depicts the apparatus of FIG. 3 and further comprises a detector 60. The detector can be a camera or other suitable light detection device. As used herein, the term "camera" may refer to any type of light detection device. In one aspect, the camera may comprise a Charge Coupled Device (CCD) chip. In another aspect, the camera may comprise a light-sensitive complementary metal-oxide-semiconductor (CMOS) chip. The camera can be configured to detect the secondary plurality of light beams and the tertiary plurality of light beams after the secondary plurality of light beams and the tertiary plurality of light beams have passed through the outgoing second prism face. In one aspect the camera can be large enough that the light beams incident on the camera are substantially non-overlapping so that each light beam may be imaged separately and individually. In one aspect, the camera can be divided into multiple sections, one section for each incident light beam. The division may be an actual physical division of the chip or may be a mathematical, logical, or hypothetical division of the chip. In a different aspect, multiple cameras or multiple CCD chips may be used to detect multiple light beams. For example, four cameras may be used to detect four light beams with each camera positioned to detect a single light beam.

While the camera 60 of FIG. 4 is shown as being positioned after the second prism 55, the camera may also be positioned after the first prism 50 of FIG. 1, or after the secondary beam splitter 35 and secondary beam reflector 44 of FIG. 2. Likewise, the camera may be positioned in any variety of places in more complex systems using additional beam splitting, beam redirecting, etc. In one aspect, the incident light beam or one or more of the split light beams can be focused into the vicinity of the camera.

Arranging the beam splitter module as outlined above, the spatial footprint of the module can be extremely compact. This can allow for desktop size devices and form factors. For example, the splitting and columnization of a light beam can be accomplished over a distance of 50 to about 150 mm for light beam diameters of 3 to 10 mm diameter. The exact spacing of the individual units can depend on the size of the units used and scale. However, as a general guideline, the beam splitter module can occupy a size of from about 10 to about 20 times the diameter of the initial beam to a plurality of 4 substantially parallel beams.

Figure 5:
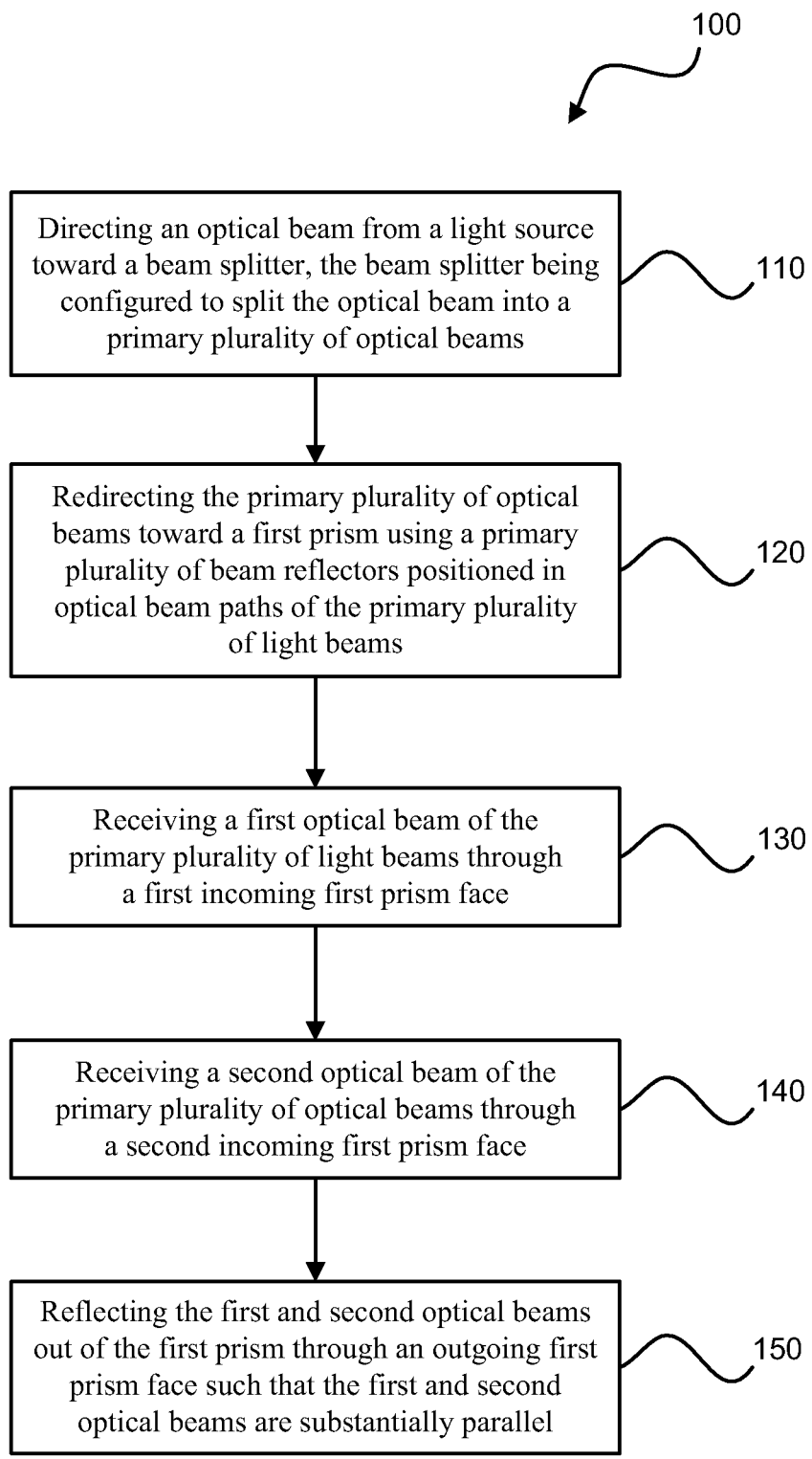
FIG. 5 is a flow diagram of a method for splitting an optical beam in accordance with an embodiment.

Referring to FIG. 5, a flow chart method 100 for splitting an optical beam is shown in accordance with an embodiment. An optical beam is directed 110 from a light source toward a beam splitter, the beam splitter being configured to split the optical beam into a primary plurality of optical beams. The primary plurality of optical beams is redirected 120 toward a first prism using a primary plurality of beam reflectors positioned in optical beam paths of the primary plurality of light beams. A first optical beam of the primary plurality of light beams is received 130 through a first incoming first prism face. A second optical beam of the primary plurality of optical beams is received 140 through a second incoming first prism face. The first and second optical beams are then reflected out of the first prism through an outgoing first prism face such that the first and second optical beams are substantially parallel.

In a more detailed embodiment of the method, the method further comprises splitting the first and second optical beams using a secondary beam splitter positioned in an optical beam path of the first and second optical beams after the first and second optical beams have passed through the outgoing first prism face. The first light beam and the second light beam are split into a secondary plurality of light beams and a tertiary plurality of light beams. The secondary plurality of light beams can be redirected in a direction substantially parallel with a direction of the tertiary plurality of light beams using a secondary beam reflector positioned in the optical beam path of the secondary plurality of light beams.

In another more detailed embodiment of the method, the method further comprises splitting the first and second optical beams using a secondary beam splitter positioned in an optical beam path of the first and second optical beams after the first and second optical beams have passed through the outgoing first prism face. The first light beam and the second light beam are split into a secondary plurality of light beams and a tertiary plurality of light beams. The secondary plurality of light beams and the tertiary plurality of light beams can be redirected toward a common second prism using a secondary plurality of beam reflectors positioned in optical beam paths of the secondary plurality of light beams and the tertiary plurality of light beams. The secondary plurality of light beams can be received through a first incoming second prism face, and the tertiary plurality of light beams can be received through a second incoming second prism face. The first and second incoming prism faces can be opposing faces. In one aspect, the light beams passing through the first incoming prism face are reflected through total internal reflection off of the second incoming prism face and the light beams passing through the second incoming prism face are reflected through total internal reflection off of the first incoming prism face. The secondary plurality of light beams and the tertiary plurality of light beams can be reflected out of the second prism through an outgoing second prism face such that the secondary plurality of light beams and the tertiary plurality of light beams are substantially parallel.

The method can further comprise detecting the secondary plurality of light beams and the tertiary plurality of light beams using a camera after the secondary plurality of light beams and the tertiary plurality of light beams have passed through the outgoing second prism face. In a different embodiment, the method further comprises detecting the first and second light beams using a camera after the first and second light beams have passed through the outgoing first prism face. In yet a different embodiment, the method further comprises detecting the secondary plurality of light beams and the tertiary plurality of light beams using a camera after the secondary plurality of light beams and the tertiary plurality of light beams have passed through and/or been reflected by the secondary beam splitter and a secondary beam reflector.

Figure 6:
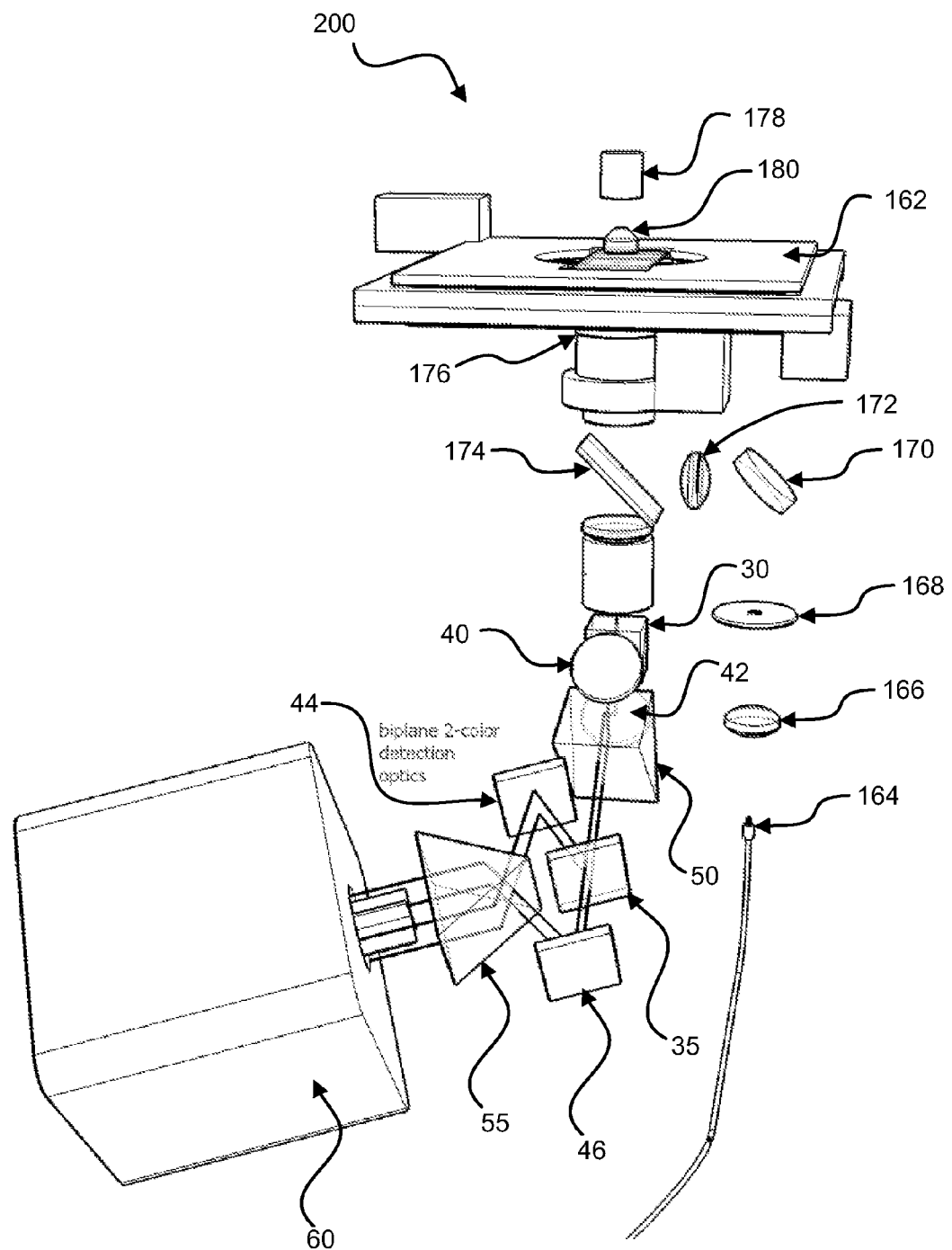
FIG. 6 is a perspective view of a system incorporating a beam splitter apparatus in accordance with an embodiment.

Referring to FIG. 6, a microscope system 200 is shown in which the beam splitter module of FIG. 4 has been incorporated. Laser light can be directed toward a sample on the sample stage 162 through an optical fiber 164 and various optical elements, such as a beam collimator 166, field aperture 168, mirror 170, excitation tube lens 172, dichroic beam splitter 174 and objective 176. Alternatively, or in addition, the light source may be a Light Emitting Diode (LED) 178 for bright field microscopy or transmission microscopy and the LED light may pass through a condensor 180 before reaching the sample. The condensor can be used to focus the light into the sample over an area corresponding to the full camera chip size. Probe molecules in the sample can be activated and caused to luminesce. Light from the luminescent probe molecules can pass through the dichroic beam splitter. The dichroic beam splitter is one example mechanism for preventing laser light, LED light, or other light from being imaged while allowing for transmission of light emitted from the probe molecules. The embodiment shown in FIG. 6 also includes a tube lens oriented immediately prior to the beam splitter module for optical refinement of probe luminescence. The beam splitting module of FIG. 4 is positioned to receive light exiting the tube lens. The beam splitting module is compact enough so that the tube lens focuses through the module onto the camera without any additional imaging optics.

In one aspect, laser beams (405 nm, 488 nm, 561 nm) can be transmitted through the optical fiber, which can be a single mode optical fiber. The dichroic beam splitter can reflect only the laser light and transmit fluorescence in the range 500-550 nm and 575-650 nm. The laser light can be used to illuminate the sample homogeneously over a rectangular area defined by the field aperture. Better data can be achieved when the field aperture is illuminated homogeneously enough that the intensity does not vary by more than 30% from corner to center. Optionally a beam homogenizer could be included to provide a more efficient use of the available laser power at maximum homogeneity of the field illumination. Field aperture size may depend on magnification of the detection optics. A good field aperture size can correspond to the size of the detected regions of interest in the sample. The effective focal length of the excitation tube lens also can be chosen accordingly.

Fluorescence in the range of 500-550 nm and 575-650 nm emitted from the sample over an area defined by the excitation field aperture can be collected by the objective lens. The fluorescence can be transmitted by the dichroic beam splitter and pass a band pass filter which blocks remaining laser light. The tube lens can focus the fluorescence light onto the camera chip through the detection beam splitter module. The neutral beam splitter cube can first split the fluorescence light into two beam paths of different lengths. The length difference can correspond to an axial distance between detection planes of about 500 nm in the sample. Two mirrors and a 60 degree prism (using total internal reflection) can be used to collimate both beams. Both beam paths can then be split according to wavelength into two beams each (4 beams total) of substantially the same length. In one aspect, length accuracy may be accurate within about 0.5 mm. Two mirrors and a 60 degree prism (using total internal reflection) can be used to collimate both beams. The four beams can be focused on the camera chip, each in a separate region of interest on the chip.

Lenses can be chosen so that each camera pixel can correspond to a size of approx. 100×100 nm, resulting in a detection magnification of approx. 65× (pixel size 6.5 microns square). In one aspect, the system can be created using a 100× objective, an approximately 0.7× tube lens, or alternatively with an approximately 60× objective with a 1× tube lens.

The length difference in the sample between the two detection planes can translate into the value of the length difference multiplied by the detection magnification squared for the length difference in the detection path. This length difference can be realized by a shift sideways between the beam splitter cube and the first prism. This can involve slight rotation of the prism and of the two mirrors between the cube and the prism to realize normal incidence of the beams on the prism surface.

The substrate of the dichroic in the detection path can be relatively thick (approx. 3 mm) to avoid strong curvature of the surface. An additional substrate in the reflected beam (glued on the prism, for example) might be used to maintain symmetry in the path length.

Regions of interest for each of the four beams can be approximately 6×5 mm (i.e., equal to a half of the chip size minus a 1 mm border around each region of interest). This area can correspond to the illuminated field of view in the sample and can be used to determine the field aperture size. In one embodiment, the distance between the centers of the regions of interest can be 8.3 mm/7 mm (camera chip size/2). The chip can be located at an axial position such that the shorter and the longer beam paths are both out of focus by a same amount but with opposing signs (e.g., negative versus positive values). The chip position can correspond to the focal plane of the objective lens. Alternative detection modules can be designed. For example, one detection module may provide a large field of view filling the complete camera chip. Another detection module can split the beam chromatically into two wavelength ranges for 2-color imaging using half of the camera chip for each of the color-channels.

Figure 7:
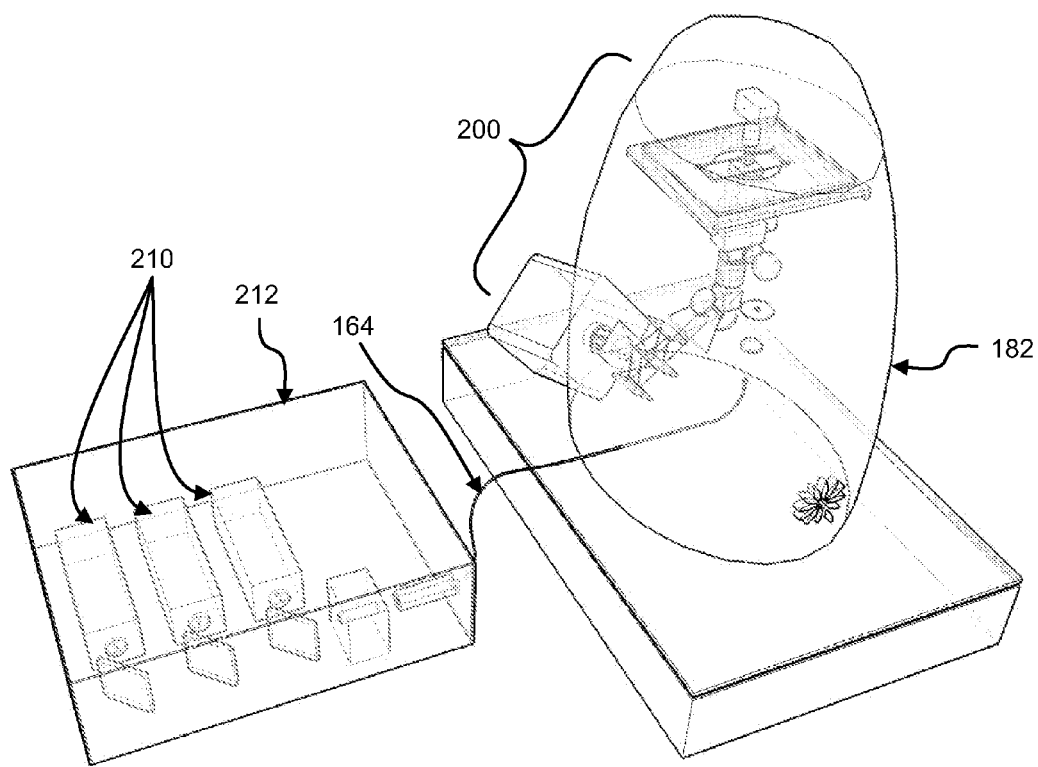
FIG. 7 is a perspective view of the system of FIG. 6 and further including multiple light sources.
Figure 8:
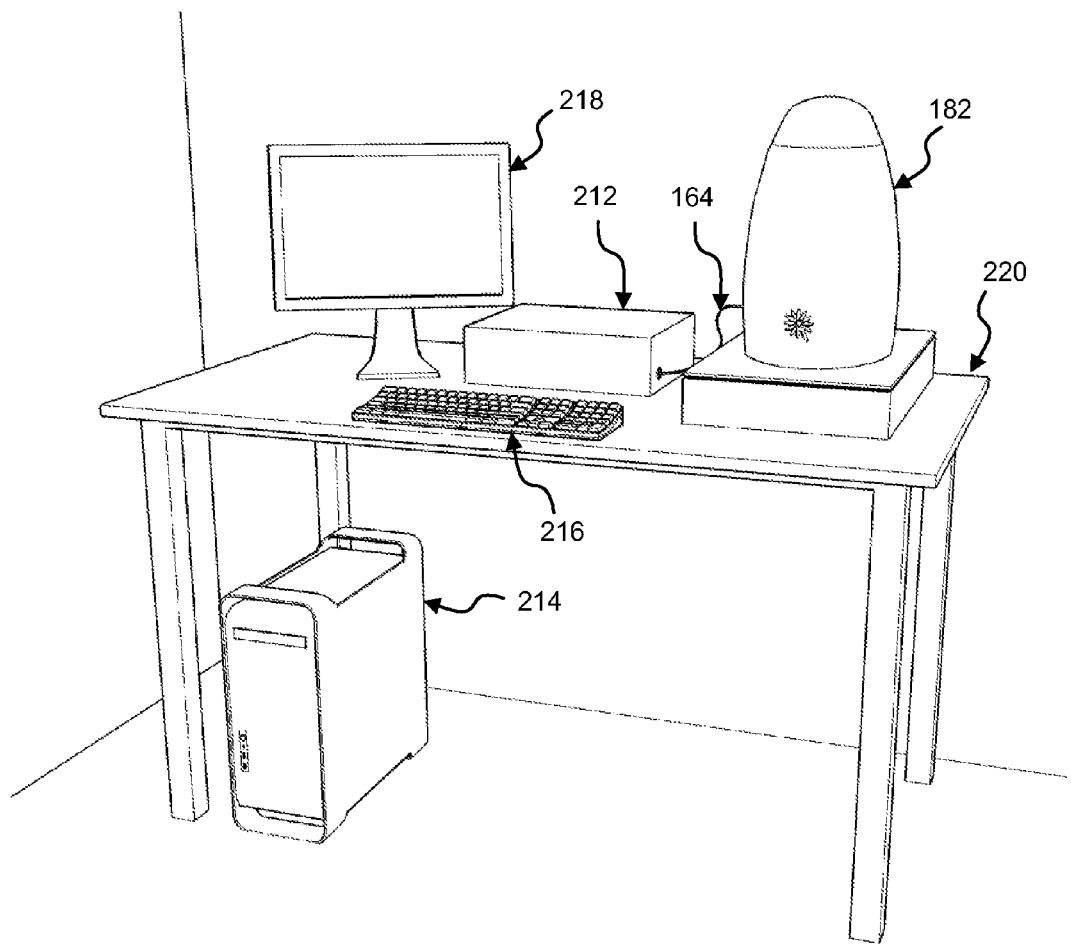
FIG. 8 is a perspective view of the system of FIG. 7 and further including a computer.

FIG. 7 depicts a more detailed embodiment of the system of FIG. 6 in which a plurality of light sources 210 are included for activating, exciting, and bleaching probe molecules oriented in an optional case 212. FIG. 7 shows the microscope system 200 connected to the plurality of light sources via the optical fiber 164. The microscope system can be conveniently oriented within a suitable housing 182. The housing can provide protection to the optics from dust and/or mechanical damage. As shown in FIG. 8, the system can be compact and contained in a small area due to the composition and arrangement of the beam splitter device. The system may comprise a computer 214 having input 216 and output 218 interfaces, and the microscope system may be small enough to fit on a small desk 220 together with the computer. These units can be operatively connected so as to allow communication of the computer with the microscope system and/or the plurality of light sources.

While the foregoing examples have been directed primarily to an apparatus involving a prism for redirecting light beams, the present technology can be implemented in the absence of such a prism. For example, mirrors or other reflective surfaces may be used to redirect light beams in a compact and efficient manner, as will now be described.

Figure 9:
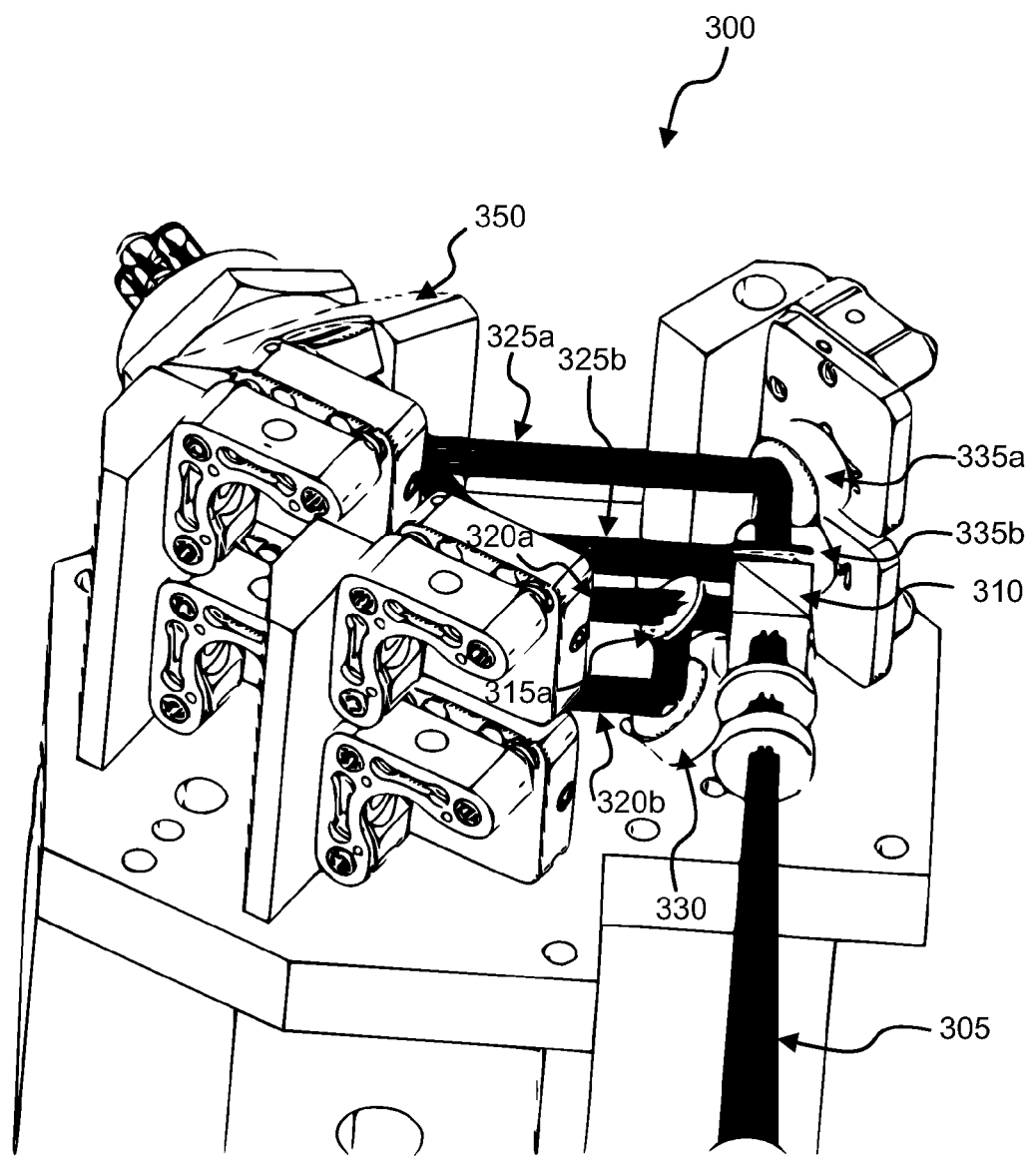
FIGS. 9-11 are various views of a beam splitter apparatus in accordance with an embodiment.
Figure 10:
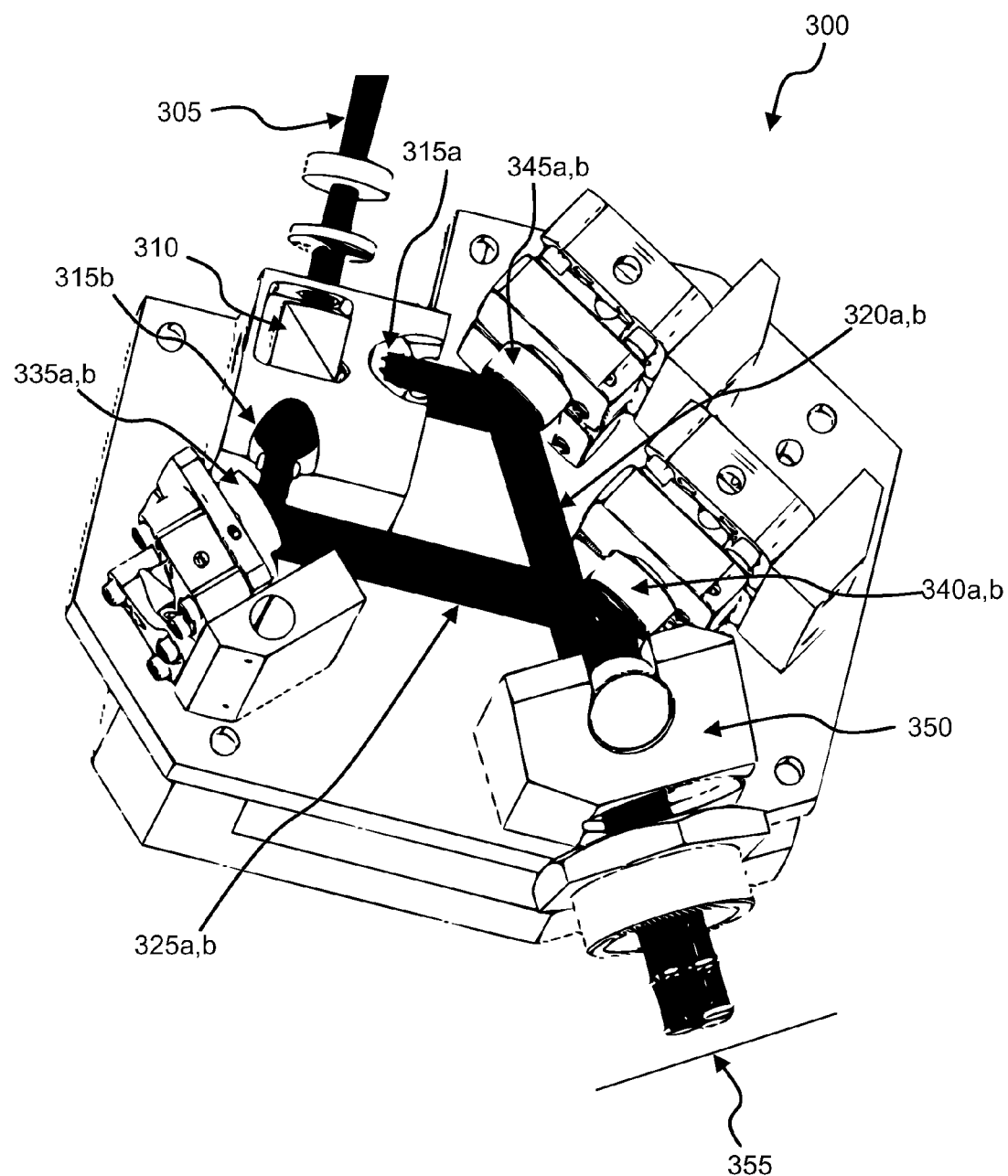
Figure 11:
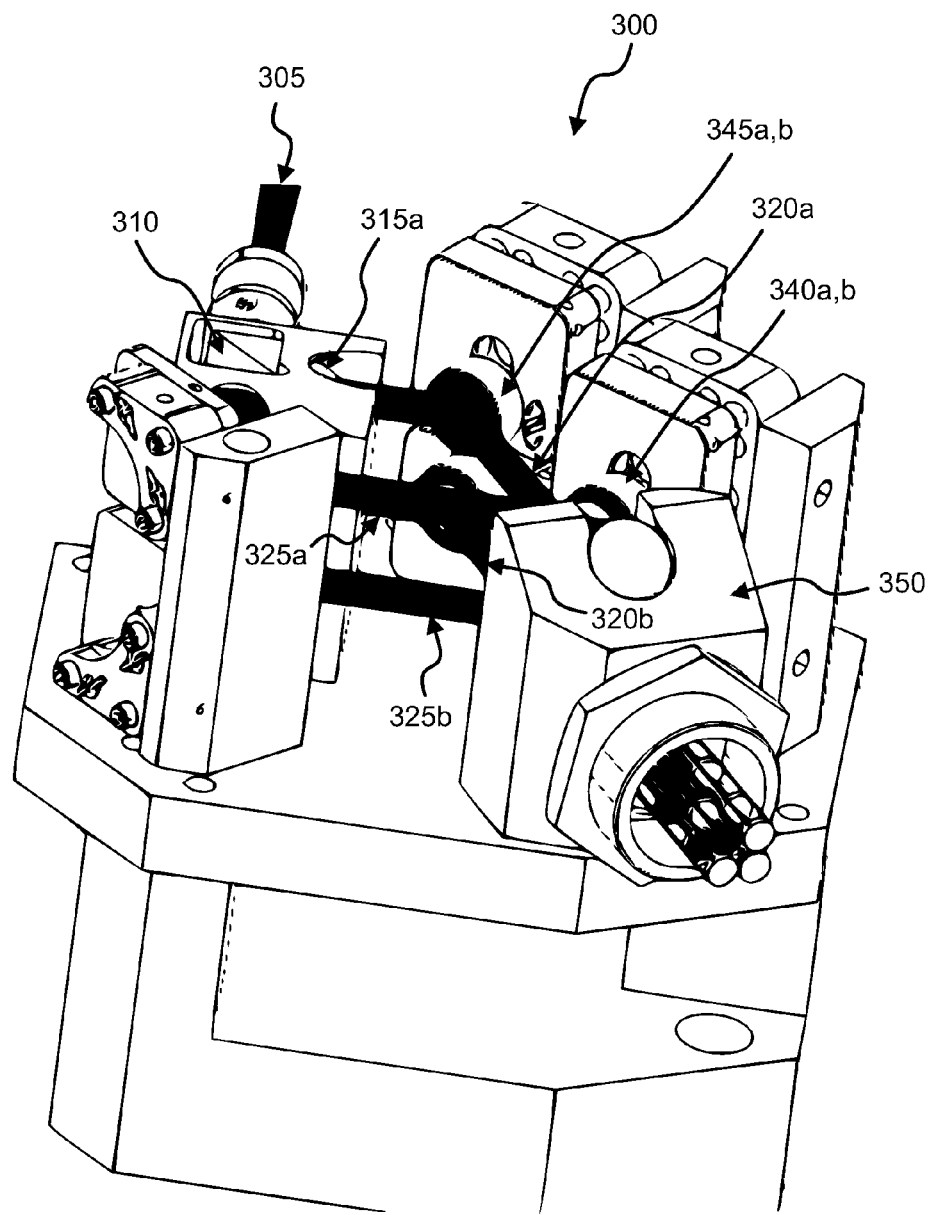

Reference will now be made to FIGS. 9-11, which show different views of an optical apparatus 300. An optical apparatus can include a primary beam splitter 310 configured to split an incident light beam 305 into a primary plurality of light beams and to direct a first beam of the primary plurality of light beams in a first direction and a second beam of the primary plurality of light beams in a second direction orthogonal to the first direction.

The optical apparatus 300 can include a plurality of secondary beam splitters 315a,b positioned in beam paths of the first and second beams of the primary plurality of light beams to split the first and second beams of the primary plurality of light beams into a secondary plurality of light beams 320a,b and to split the second beam of the primary plurality of light beams into a tertiary plurality of light beams 325a,b. The plurality of secondary beam splitters can be oriented to direct a first beam of the secondary plurality of light beams and a first beam of the tertiary plurality of light beams orthogonal to one another. The plurality of secondary beam splitters can be oriented to direct a second beam of the secondary plurality of light beams and a second beam of the tertiary plurality of light beams both parallel to one another and orthogonal to the first beam of the secondary plurality of light beams and the first beam of the tertiary plurality of light beams. A primary plurality of beam reflectors 335a,b, 340a,b, and/or 345a,b, such as mirrors, for example, can be positioned to redirect the secondary and tertiary plurality of light beams toward a common detector 355, such as a camera or the like configured to detect the secondary and tertiary pluralities of light beams.

The optical apparatus 300 can further include a secondary plurality of reflectors 330 (one of the plurality is shown in the figures) positioned in beam paths of the second beam 320b of the secondary plurality of light beams and the second beam 325b of the tertiary plurality of light beams between the plurality of secondary beam splitters and the primary plurality of beam reflectors 335a,b, 340a,b, and/or 345a,b. The secondary plurality of reflectors can be oriented to redirect the second beam of the secondary plurality of light beams parallel to the first beam of the secondary plurality of light beams and to redirect the second beam of the tertiary plurality of light beams parallel to the first beam of the tertiary plurality of light beams.

The primary plurality of beam reflectors 335a,b, 340a,b, and/or 345a,b can be oriented to direct the secondary plurality of light beams directly toward the detector and to direct the tertiary plurality of light beams toward a tertiary plurality of beam reflectors oriented to direct the tertiary plurality of light beams directly toward the detector. In one aspect, the tertiary plurality of beam reflectors can include a separate beam reflector for each of the light beams of the tertiary plurality of light beams. Similarly, the primary plurality of beam reflectors can include a separate beam reflector for each beam of the secondary and tertiary pluralities of light beams. Alternately, the tertiary plurality of beam reflectors may instead be a single tertiary reflector configured to redirect multiple beams of light. Similarly, the primary plurality of beam reflectors may comprise reflectors configured to redirect multiple beams of light with a single reflector.

In a more detailed example, path lengths of the first and second light beams of the secondary plurality of light beams can be substantially the same. Also, path lengths of the first and second light beams of the tertiary plurality of light beams can be substantially the same. However, the path lengths of the first and second light beams of the secondary plurality of light beams in this example can be shorter than the path lengths of the first and second light beams of the tertiary plurality of light beams. In one aspect, each beam of the secondary and tertiary pluralities of light beams has a different path length. The difference in light beam paths for the first, second and tertiary sets of light beams can be adjusted based on relative geometry of the beam splitters.

As with the examples described heretofore, the beam splitters (primary and/or secondary) may comprise any of a variety of known beam splitter types. The configuration and setup of the apparatus may vary somewhat depending on selection of a particular type of beam splitter for a particular location. The following examples are for illustrative purposes and are not intended to be limiting. Indeed other configurations for beam splitter arrangement and beam splitter types are also contemplated and are considered within the scope of this disclosure.

In a first example beam splitter arrangement, the primary beam splitter 310 can be a neutral beam splitter and the plurality of secondary beam splitters 315a,b can be dichroic beam splitters. In this arrangement, the secondary and tertiary pluralities of light beams each comprise a set of an upper beam 320a or 325a and a lower beam 320b or 325b. The apparatus is configured to direct light beams of the secondary and tertiary pluralities of light beams having a first color along the upper beam and to direct light beams of the secondary and tertiary pluralities of light beams having a second color along the lower beam.

In a second example beam splitter arrangement, the primary beam splitter 310 can be a dichroic beam splitter and the plurality of secondary beam splitters 315a,b can be neutral beam splitters. In this arrangement, the secondary plurality of light beams 320a,b can be light beams of a first color, the tertiary plurality of light beams 325a,b can be light beams of a second color, and an optical path length between the primary beamsplitter and the detector for the first light beam of the secondary plurality of light beams can be shorter than an optical path length between the primary beamsplitter and the detector 355 for the second light beam of the secondary plurality of light beams.

The optical apparatus 300 can include a plurality of wavelength dependent filters (inside housing 350) between the primary plurality of beam reflectors 335a,b, 340a,b, and/or 345a,b and the detector 355. In one example, the secondary plurality of light beams can be directed to a first filter of the plurality of wavelength dependent filters and the tertiary plurality of light beams can be directed to a second filter of the plurality of wavelength dependent filters. In another example, the first beam of the secondary plurality of light beams and the first beam of the tertiary plurality of light beams can be directed to a first filter of the plurality of wavelength dependent filters and the second light beam of the secondary plurality of light beams and the second light beam of the tertiary plurality of light beams can be directed to a second filter of the plurality of wavelength dependent filters.

Figure 12:
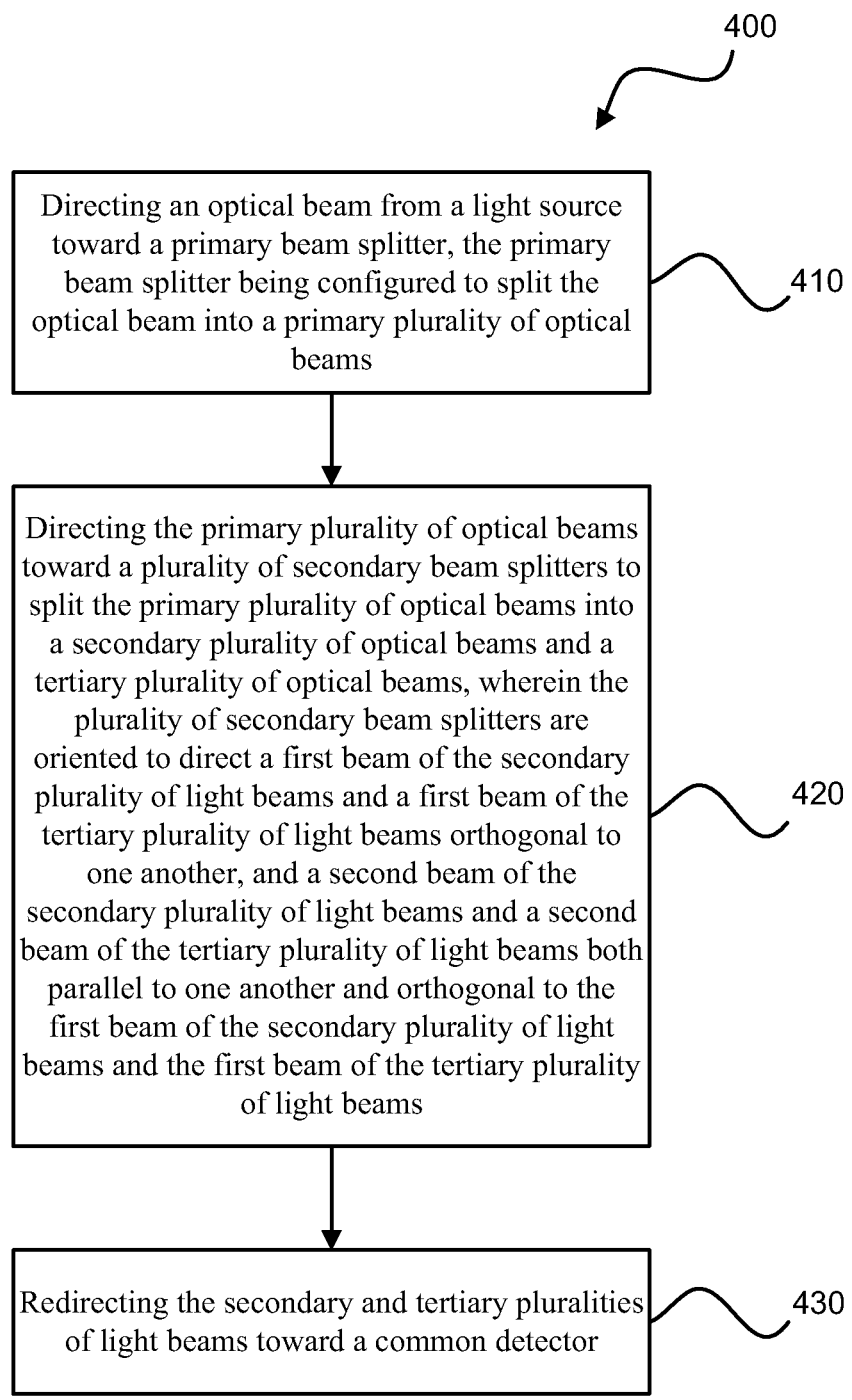
FIG. 12 is a flow diagram of a method for splitting an optical beam in accordance with an embodiment.

With reference to FIG. 12, a method 400 is shown for splitting an optical beam in accordance with an example of the present technology. The method can include directing 410 an optical beam from a light source toward a primary beam splitter, the primary beam splitter being configured to split the optical beam into a primary plurality of optical beams. The primary plurality of optical beams can be directed 420 toward a plurality of secondary beam splitters to split the primary plurality of optical beams into a secondary plurality of optical beams and a tertiary plurality of optical beams, wherein the plurality of secondary beam splitters are oriented to direct a first beam of the secondary plurality of light beams and a first beam of the tertiary plurality of light beams orthogonal to one another, and a second beam of the secondary plurality of light beams and a second beam of the tertiary plurality of light beams both parallel to one another and orthogonal to the first beam of the secondary plurality of light beams and the first beam of the tertiary plurality of light beams. The secondary and tertiary pluralities of light beams can be redirected 430 toward a common detector.

The method can further include redirecting the secondary and tertiary pluralities of light beams using a secondary plurality of reflectors positioned in beam paths of the second beam of the secondary plurality of light beams and the second beam of the tertiary plurality of light beams between the plurality of secondary beam splitters and the primary plurality of beam reflectors, the secondary plurality of reflectors being oriented to redirect the second beam of the secondary plurality of light beams parallel to the first beam of the secondary plurality of light beams and to redirect the second beam of the tertiary plurality of light beams parallel to the first beam of the tertiary plurality of light beams.

The method can further include filtering the secondary and tertiary pluralities of light beams using a plurality of wavelength dependent filters between the primary plurality of reflectors and the detector, each of the plurality of wavelength dependent filters being positioned to filter approximately one half of the light beams of the secondary and/or tertiary pluralities of light beams.

The method can also include detecting the secondary and tertiary pluralities of light beams with the detector. In one aspect, each beam of the secondary and tertiary pluralities of light beams has a different path length between the primary beam splitter and the detector.

In accordance with an embodiment, the beam splitter apparatus is configured in a microscope system for imaging a sample. The microscope system can include an electronically adjustable sample stage. The system can include optics configured to collect light from the sample and transfer an image of the sample to a camera. The camera can be a high frame rate camera and can be configured to capture an image of the sample on the sample stage. The beam splitter apparatus can be oriented or positioned between the sample stage and the camera so that the incident light beam passes through the sample stage and into the beam splitter apparatus. The camera can be oriented or positioned to capture the substantially parallel light beams, such as those that exit either the first or second prisms. The system can further include a computer. The computer can be configured to perform a scan of the sample by adjusting the sample stage and capturing images of the sample using the camera in coordination with the sample stage adjustment.

With the general examples set forth in above, it is noted in the present disclosure that when describing a device or apparatus, or any related devices, methods, systems, and so forth, individual or separate descriptions are considered applicable to one other, whether or not explicitly discussed in the context of a particular example or embodiment. For example, in discussing the optical apparatus per se, other device, system, and/or method embodiments are also included in such discussions, and vice versa. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An optical apparatus, comprising:
  a primary beam splitter configured to split an incident light beam into a primary plurality of light beams and to direct a first beam of the primary plurality of light beams in a first direction and a second beam of the primary plurality of light beams in a second direction orthogonal to the first direction;
  a secondary beam splitter positioned in beam paths of the first and second beams of the primary plurality of light beams to split the first and second beams of the primary plurality of light beams into a secondary plurality of light beams and to split the second beam of the primary plurality of light beams into a tertiary plurality of light beams, wherein the secondary beam splitter is oriented to direct a first beam of the secondary plurality of light beams and a first beam of the tertiary plurality of light beams orthogonal to one another, and a second beam of the secondary plurality of light beams and a second beam of the tertiary plurality of light beams both parallel to one another and orthogonal to the first beam of the secondary plurality of light beams and the first beam of the tertiary plurality of light beams; and a primary plurality of beam reflectors positioned to redirect the secondary and tertiary plurality of light beams toward a common detector.

2. An apparatus in accordance with claim 1, wherein the secondary beam splitter comprises a plurality of secondary beam splitters and the primary plurality of beam reflectors comprises a plurality of faces of a prism.

3. An apparatus in accordance with claim 1, wherein the primary plurality of beam reflectors comprises a plurality of faces of a prism.

4. An apparatus in accordance with claim 1, wherein the primary plurality of beam reflectors comprises a plurality of mirrors.

5. An apparatus in accordance with claim 1, wherein the primary plurality of beam reflectors is oriented to direct the secondary plurality of light beams directly toward the detector and to direct the tertiary plurality of light beams toward a tertiary plurality of beam reflectors oriented to direct the tertiary plurality of light beams directly toward the detector.

6. An apparatus in accordance with claim 1, wherein the primary plurality of beam reflectors comprises a separate beam reflector for each of the secondary and tertiary pluralities of light beams.

7. An apparatus in accordance with claim 5, wherein the tertiary plurality of beam reflectors comprises a separate beam reflector for each of the light beams of the tertiary plurality of light beams.

8. An apparatus in accordance with claim 1, wherein:
path lengths of the first and second light beams of the secondary plurality of light beams are substantially the same;
path lengths of the first and second light beams of the tertiary plurality of light beams are substantially the same; and
the path lengths of the first and second light beams of the secondary plurality of light beams are shorter than the path lengths of the first and second light beams of the tertiary plurality of light beams.

9. An apparatus in accordance with claim 1, wherein the primary beam splitter comprises a neutral beam splitter and the secondary beam splitter comprise a dichroic beam splitter.

10. An apparatus in accordance with claim 1, wherein the primary beam splitter comprises a dichroic beam splitter and the secondary beam splitter comprises a neutral beam splitter.

11. An apparatus in accordance with claim 10, wherein the secondary plurality of light beams comprise light beams of a first color and an optical path length between the primary beam splitter and the detector for the first light beam of the secondary plurality of light beams is shorter than an optical path length between the primary beam splitter and the detector for the second light beam of the secondary plurality of light beams.

12. An apparatus in accordance with claim 9, wherein the secondary and tertiary pluralities of light beams each comprise a set of an upper beam and a lower beam, wherein the apparatus is configured to direct light beams of the secondary and tertiary pluralities of light beams having a first color along the upper beam and to direct light beams of the secondary and tertiary pluralities of light beams having a second color along the lower beam.

13. An apparatus in accordance with claim 1, wherein each beam of the secondary and tertiary pluralities of light beams has a different path length.

14. An apparatus in accordance with claim 1, further comprising a plurality of wavelength dependent filters between the primary plurality of beam reflectors and the detector.

15. An apparatus in accordance with claim 14, wherein the secondary plurality of light beams is directed to a first filter of the plurality of wavelength dependent filters and the tertiary plurality of light beams is directed to a second filter of the plurality of wavelength dependent filters.

16. An apparatus in accordance with claim 14, wherein the first beam of the secondary plurality of light beams and the first beam of the tertiary plurality of light beams are directed to a first filter of the plurality of wavelength dependent filters and the second light beam of the secondary plurality of light beams and the second light beam of the tertiary plurality of light beams are directed to a second filter of the plurality of wavelength dependent filters.

17. A method for splitting an optical beam, comprising:
directing an optical beam from a light source toward a primary beam splitter, the primary beam splitter being configured to split the optical beam into a primary plurality of optical beams;
directing the primary plurality of optical beams toward at least one secondary beam splitter to split the primary plurality of optical beams into a secondary plurality of optical beams and a tertiary plurality of optical beams, wherein the plurality of secondary beam splitters are oriented to direct a first beam of the secondary plurality of light beams and a first beam of the tertiary plurality of light beams orthogonal to one another, and a second beam of the secondary plurality of light beams and a second beam of the tertiary plurality of light beams both parallel to one another and orthogonal to the first beam of the secondary plurality of light beams and the first beam of the tertiary plurality of light beams; and
redirecting the secondary and tertiary pluralities of light beams toward a common detector.

18. A method in accordance with claim 17, further comprising:
redirecting the secondary and tertiary pluralities of light beams using a secondary plurality of reflectors positioned in beam paths of the second beam of the secondary plurality of light beams and the second beam of the tertiary plurality of light beams between the secondary beam splitter and the primary plurality of beam reflectors, the secondary plurality of reflectors being oriented to redirect the second beam of the secondary plurality of light beams parallel to the first beam of the secondary plurality of light beams and to redirect the second beam of the tertiary plurality of light beams parallel to the first beam of the tertiary plurality of light beams.

19. A method in accordance with claim 17, wherein each beam of the secondary and tertiary pluralities of light beams has a different path length.

20. A method in accordance with claim 17, further comprising:
filtering the secondary and tertiary pluralities of light beams using a plurality of wavelength dependent filters between the primary plurality of reflectors and the detector, each of the plurality of wavelength dependent filters being positioned to filter approximately one half of the light beams of the secondary and/or tertiary pluralities of light beams; and
detecting the secondary and tertiary pluralities of light beams with the detector.

* * * * *